United States Patent [19]

Leger

[11] Patent Number: 5,752,452
[45] Date of Patent: May 19, 1998

[54] APPARATUS AND METHOD FOR OXYGEN LANCING IN A MULTIPLE HEARTH FURNACE

[75] Inventor: Christopher Brian Leger, White Plains, N.Y.

[73] Assignee: Praxair Technology, Inc., Danbury, Conn.

[21] Appl. No.: 738,139

[22] Filed: Oct. 25, 1996

[51] Int. Cl.$^6$ .................................................. F23G 7/04
[52] U.S. Cl. ........................ 110/346; 110/211; 110/225; 110/251
[58] Field of Search ......................... 110/210, 211, 110/214, 225, 244, 251, 346

[56] References Cited

U.S. PATENT DOCUMENTS

| | | | |
|---|---|---|---|
| 4,481,890 | 11/1984 | Lewis | 110/225 |
| 4,630,555 | 12/1986 | Guillaume et al. | 110/346 |
| 4,957,050 | 9/1990 | Ho | 110/346 |
| 5,000,102 | 3/1991 | Ho | 110/346 |
| 5,176,086 | 1/1993 | Clark et al. | 110/346 |

*Primary Examiner*—Denise L. Ferensic
*Assistant Examiner*—Pamela A. Wilson
*Attorney, Agent, or Firm*—Stanley Ktorides

[57] ABSTRACT

An improved apparatus and method for efficiently processing material, e.g. incinerating waste material, particularly dewatered waste water sludge, in a multiple hearth furnace by injecting high velocity jets of oxygen into the heating or drying zone of the furnace to augment turbulent gas-phase mixing, to aid in the burnout of carbon monoxide and hydrocarbons in the gas phase to achieve lower emissions, to increase convection over the drying sludge to increase its drying rate, and to ignite the drying sludge to further increase its drying rate. The apparatus and method provides an increase in sludge throughput and a reduction in carbon monoxide, nitrogen oxides and hydrocarbon emissions.

16 Claims, 3 Drawing Sheets

APPARATUS AND METHOD FOR OXYGEN LANCING IN A MULTIPLE HEARTH FURNACE

FIELD OF THE INVENTION

The invention relates generally to multiple hearth furnaces and is particularly useful where the material to be processed in the furnace contains water and must be dried as well as heated.

BACKGROUND OF THE INVENTION

Multiple hearth furnaces are of a type having a plurality of hearths located one above the other. The material being processed by the furnace is supplied into the uppermost hearth and proceeds to the lowermost one from which the finished product is extracted. During the course of travel the material is subjected to various temperatures to accomplish processes such as drying, combustion and cooling. Such furnaces are widely used for a variety of applications such as sludge incineration, combustion of other waste material, activated carbon regeneration, magnesia calcining, ore processing and others. In all such applications improvement of furnace efficiency and achieving increased throughput of the product being processed are desirable goals.

In one application, hereafter used to explain the invention, the multiple hearth furnace is used to incinerate dewatered sludge from municipal sewage to form ash that can be disposed of. In such an application the multiple hearths of the furnace form, from top to bottom of the furnace, a drying zone into which the wet sludge is introduced for drying, a burning zone in which the at least partially dried sludge is burned, and a cooling zone in which the ash is cooled and from which it is removed from the furnace.

The equipment and process for a multiple hearth incinerator have relatively high capital and operating costs. At the same time, many municipalities have a need to handle increasing amounts of sludge. In the past, owners of multiple hearth incinerators seeking increased capacity were faced with building new incinerators or finding alternative means of disposal for their sludge. Further, recently imposed regulations require most of these incinerator furnaces to be operated with afterburners. The afterburners are used to control emissions of hydrocarbons which include malodorous compounds. These are normally produced in the furnace and are not normally destroyed within the furnace due to poor gas phase mixing and locally low temperatures. The use of such afterburners also increases fuel consumption, tends to limit sludge throughput, and reduces overall furnace fuel efficiency. All of these factors point to a need for improvement in furnace throughput.

Multiple hearth incinerators can be operated under a wide range of stoichiometric conditions. Operation under fuel rich conditions allows control of peak temperatures in the furnace and also allows the furnaces to run with little or no auxiliary fuel. The furnaces are often operated under oxidizing conditions to reduce the occurrence of black smoke and malodorous emissions. Operating with near stoichiometric amounts of air yields the best fuel efficiency for these furnaces, but it also leads to overheating of the burning zone which could damage refractory material of the furnace itself or cause slag formation. To overcome these problems, most multiple hearth furnaces operate today with large amounts of excess air to limit the burning zone temperature. This is done at the cost of increased fuel consumption. The presence of the excess air also increases the furnace exhaust gas flow rate which leads to higher fuel consumption by the afterburners because they are typically required to heat all furnace exhaust gas to a specified temperature.

Multiple hearth incinerators have been operated under reducing conditions to improve throughput and fuel efficiency. Such furnaces require a large afterburner chamber to destroy the combustibles in the furnace off gas. Although operating an incinerator under reducing conditions is technically feasible, high maintenance costs and operational difficulties make it unattractive commercially.

BRIEF DESCRIPTION OF THE INVENTION

The present invention relates to an improvement in multiple hearth furnaces in which lancing with oxygen at a specific location is used to improve throughput, reduce fuel consumption, and reduce hydrocarbon emissions. Also, the added oxygen serves to reduce the furnace exhaust gas flow rate, which reduces furnace afterburner fuel consumption.

In accordance with the invention, high velocity oxygen lances are used to inject oxygen into the furnace. This provides strong convection and rapid gas phase mixing in the hearth into which the oxygen is injected to improve combustion efficiency and augment heat transfer. In a preferred embodiment, the oxygen is injected into the furnace heating or drying zone at the lowest heating or drying hearth above the burning zone. This achieves both the advantages of better mixing and better combustion control at the same time. The combustible gas from the furnace burning zone is used as a source of heat in the heating or drying zone and the heating and drying is augmented by the highly convective flow of the hot gases over the sludge. The intense convection of the hot gases over the wet sludge also causes combustion of the wet solids directly, which releases heat, augments the drying rate and reduces the amount of sludge which must be combusted in the lower hearths.

The oxygen jets of the invention provide improved results over a conventional multiple hearth furnace because the oxygen jets have higher velocity and contain a more concentrated oxidant. Because oxygen is used, combustion is more readily promoted and higher temperatures are reached for a given amount of combustible gas, which is generally an advantage in the heating and drying zone. Oxygen can be used to increase the sludge throughput to a greater degree than can be achieved with high velocity air jets because the oxygen does not create as much exhaust gas per unit sludge. Therefore, the use of oxygen jets achieves a higher sludge throughput for the same exhaust gas flow rate as limited by the size of existing equipment including the induced draft fan, scrubbers, ducts, and stack. The use of high velocity oxygen lancing, rather than air, provides better mixing and better control of the combustion process.

OBJECTS OF THE INVENTION

It is therefore an object of the invention to provide an improved multiple hearth furnace and a method of operating such furnace using oxygen lances.

A further object is to provide a multiple hearth furnace in which oxygen is injected at a high velocity to establish a turbulent, cyclonic type, flow that improves the mixing of the furnace gases.

BRIEF DESCRIPTION OF THE DRAWINGS

Other objects and advantages of the present invention will become more apparent upon reference to the following specification and annexed drawings in which.

DETAILED DESCRIPTION OF THE INVENTION

The invention is described with respect to the incineration of wet sludge such as dewatered sewage sludge but has other applications. For example, the invention may be used for roasting ores, drying and calcining lime, magnesite and carbonate sludges, regeneration of activated carbon, reactivation of decolorizing earths and burning of sulfides. Products which may be produced or recovered with the practice of the invention include lime, zinc, lead, mercury, gold, silver, sulfuric acid, paint pigments, refractory clays, activated carbon, foundry sand and Fuller's earth.

Figure 1:
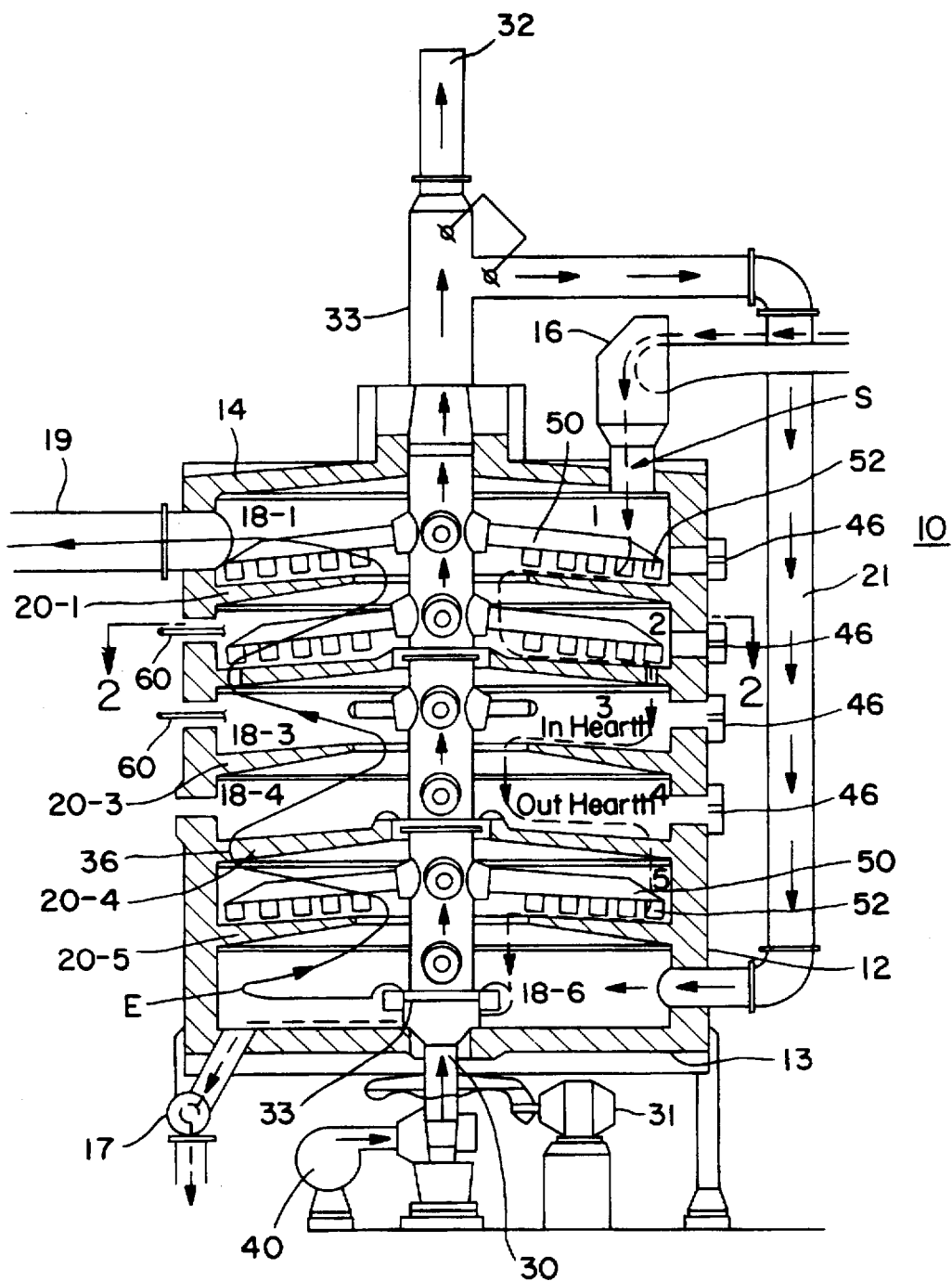
FIG. 1 is an elevational view in cross-section of a multiple hearth furnace incorporating the invention.
Figure 2:
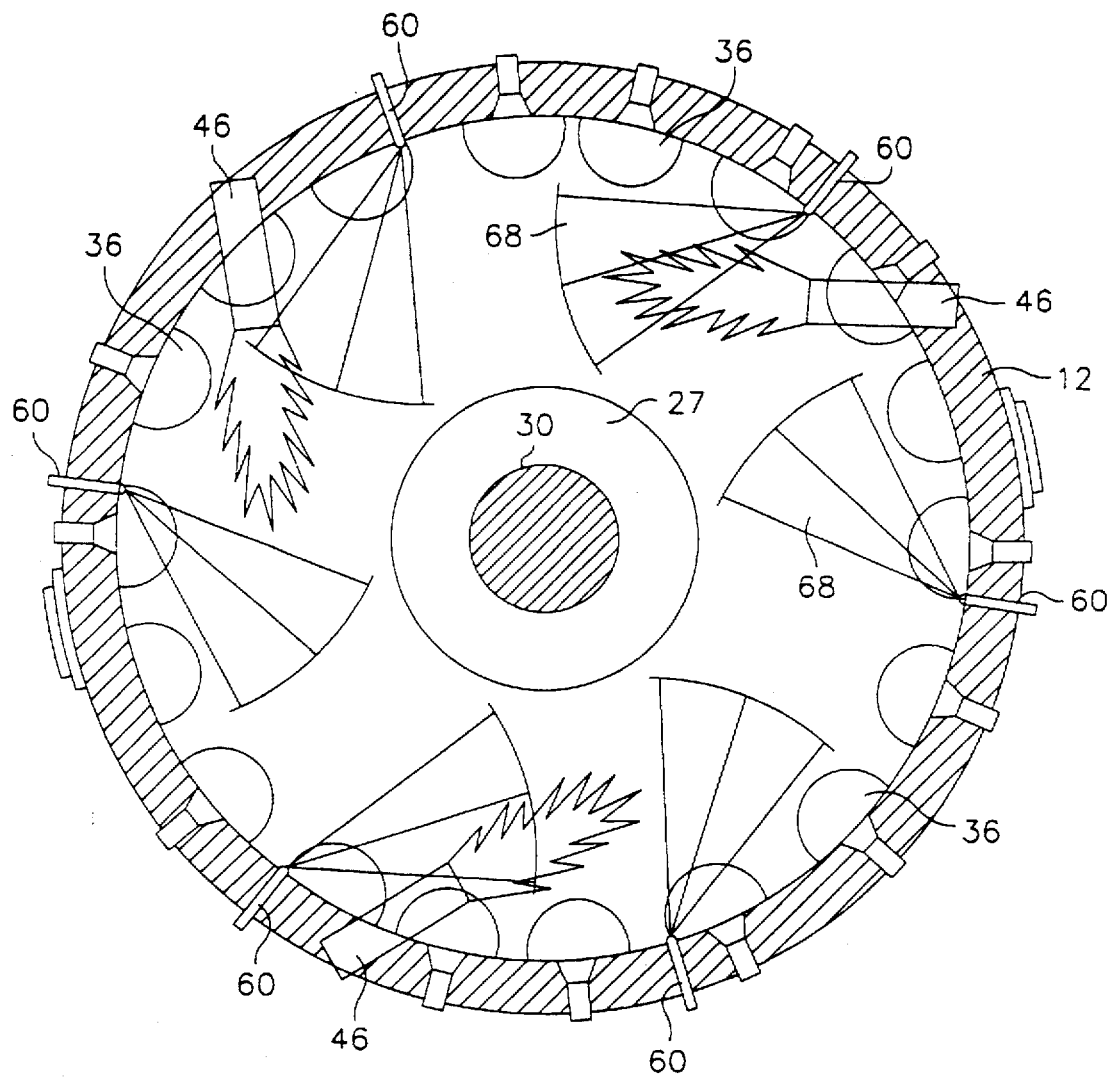
FIG. 2 is a top view of the furnace in cross-section taken along lines 2—2 of FIG. 1.

FIGS. 1 and 2 show in skeletal form the basic parts of a multiple hearth furnace or incinerator (10). There is an overall furnace body, or housing, (12) made of a shell of a material such as steel that is lined with a suitable refractory material. The furnace housing has a bottom wall (13) and a top wall (14). The furnace housing (12) has the desired capacity as determined by the furnace body height and diameter. There is an inlet (16) for the dewatered sludge to be incinerated at the furnace top and an outlet (17) for the cooled ash at the furnace bottom. There is also an exhaust (19) for flue gases, shown at the upper end of the furnace, although it also could be in the top wall (14).

The multiple hearth furnace has a plurality of hearths (18-1) through (18-6) located one above the other formed by dividing hearth floors (20-1) through (20-5), which are also of a suitable refractory material. Each of the hearth floors (20-1) through (20-5) has a central opening through which a vertically extending shaft (30) passes. The shaft is driven by a motor (31) of suitable horsepower with any suitable conventional type of drive mechanism, for example, a gear drive. A blower (40) provides cooling air to center tube (33) from which it is piped to cool the rabble arms and is returned to an annular tube and passed out of the furnace. A portion is directed through a conduit (21) back to the lower hearth (20-5) of the furnace as preheated combustion air.

The central opening (27) of each of hearth floors (20-1), (20-3) and (20-5) is enlarged to provide a drop hole passage for the solids and the surface of these hearth floors are continuous out to the outer wall of the furnace housing. Each of the other hearth floors (20-2) and (20-4) has a seal around its central opening extending to the shaft (30). The seal on the lowest hearth floor covers a hole in the furnace bottom wall through which the shaft (30) passes to the drive mechanism (31). As shown in FIG. 2, the hearth floors (20-2) and (20-4) have a plurality of drop openings (36), which can be semi-circular holes or the equivalent, around its periphery along the furnace housing wall.

The multiple hearth furnace or incinerator (10) has a heating zone which in this case is a drying zone that receives the wet dewatered sludge, a burning or combustion zone in which the heated and at least partly dried sludge is burned to produce ash, and a cooling zone in which the burned ash is cooled before its discharge. In the furnace of FIG. 1 used to describe the invention, the drying zone is formed by hearths (18-1) and (18-2), the burning zone by hearths (18-3) and (18-4) and the cooling zone by the remaining hearths (18-5) and (18-6). It should be understood that there is no clear boundary between the burning and heating zones in a commercial furnace. Typically, in and between the heating and burning zones there is a continuous transition from wet, non-burning sludge to apparently dry sludge which contains many glowing embers and which produces considerable amounts of luminous flame above its surface. Furnaces of this type can have any number of hearths as desired, with units of 5 and 6 hearths, as well as 11, 12 and more hearths, being possible. Also, the various zones can have any desired number of hearths. For example, a heating zone in an eleven hearth furnace can comprise four or five hearths.

The furnace is shown as being supplied with fuel through one or more burner inlets (46). As shown in FIG. 1, the burners (46) are in the drying zone hearths (18-1) and (18-2) and in the burning zone hearths (18-3) and (18-4). In a furnace in which a number of hearths are used to form the drying zone, there can be burners in all or in only some of the hearths. While FIG. 1 shows burners (46) in the burning zone, such burners in the burning zone might not be necessary in a particular furnace. Burners may be positioned in any number or in all of the hearths of the furnace. Oxygen lances (60) are also shown in FIG. 1 in the lower drying zone hearth (18-2) and in the upper burning zone hearth (18-3)

Gas is typically used as the fuel supplied to the burners although oil also can be used. Some furnaces operate without auxiliary fuel, deriving all of the heat from the combustion of sludge (autogenous operation). In the following description the term "combustible gas" is used to encompass gases originating from either the partial combustion of the sludge or from the addition of auxiliary fuel. It is preferable to derive as much heat in the drying zone as possible from sludge-derived combustible gas in order to reduce the consumption of purchased fuel.

Where burners are used in a hearth, there preferably are a plurality, three for example, spaced around the housing. Each burner has an outlet nozzle (not shown) with outlet holes to direct the flame flow in a given direction, for example counterclockwise, within and around the housing. There are a sufficient number of burners (46) of suitable capacity to achieve the desired temperature in the drying zone and in the burning zone, if burners are used there. The burners may also provide oxidant, e.g. air, into the hearth along with the fuel.

The shaft (30) carries several, usually two or four, rabble arms (50) in each of the hearths. The interior of each rabble arm (50) receives cooling air from the air blower (40). Each of the rabble arms has teeth (52) on its lower part to engage and spread out the sludge material and sweep it across the respective hearth floor (20) so that the material being processed is exposed to the conditions in the hearth. The material is also moved to the drop holes in the floor so that it is passed to the next lower hearth.

As shown more clearly in FIG. 2, a plurality of oxygen lances (60) are spaced around the wall of the furnace housing (12) in the drying zone lower hearth (18-2) and the burning zone upper hearth (18-3). Six such lances are illustratively shown spaced equidistant, i.e. 60°, apart around the housing wall while avoiding obstructions such as the burners and access doors (not shown). There can be fewer or more of the lances to satisfy a particular application, as required.

Each of the lances (60) injects oxidant into the hearth into which it projects. The lance may also inject fuel along with oxygen into the hearth, i.e. the lance may be an oxy-fuel burner. The "oxidant" is an oxygen-containing gas with more oxygen than air, up to 100% oxygen. As used herein the term "oxygen" means a fluid having any oxygen concentration which equals or exceeds 22 mole percent. Preferably oxygen is in the form of a fluid having an oxygen concentration of at least 30, most preferably at least 90, mole percent. The oxygen may also be commercially pure oxygen having an oxygen concentration of 99.5 mole percent or more.

Figure 3:
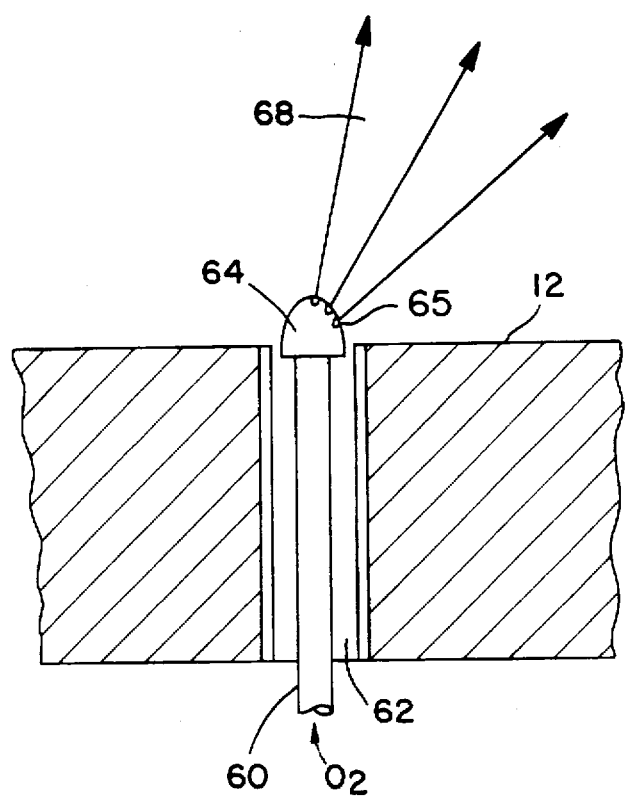
FIG. 3 is an elevational view of one embodiment of an oxygen lance useful in the practice of the invention.

As shown in FIG. 3, each of the lances is inserted through a tube (62) to allow the furnace draft to draw in air to cool the lance. In the embodiment illustrated in FIG. 3, each lance has a nozzle (64) made from a suitable high temperature material, for example HR-160 cobalt alloy, to withstand the harsh conditions within the furnace with only a limited amount of cooling. Each nozzle (64) has several oxygen outlet passages (65), for example three, which in a typical embodiment are 0.25 inch holes angled at 35°, 55° and 75° to the lance axis.

As seen in FIG. 2, each lance nozzle (64) emits a jet of oxygen that produces a flow pattern (68) of oxygen over a sector as determined by the angulation of the nozzle outlet passages (65). The lance axes are pointed radially toward the central axis of the cylindrical furnace, with the holes pointed to give a counterclockwise swirling, or cyclonic, flow as viewed from above. The direction of the oxygen swirling flow is selected to be the same as that of the swirling flow created by the gas/air burners (46) of the same hearth which are angled in the same direction. The oxygen is injected at a high velocity, preferably exceeding 350 feet per second, most preferably sonic velocity, i.e. about 1000 feet per second. Lower velocities can be used in smaller volume furnaces but the velocity should be sufficiently high so as to achieve adequate mixing with the combustible gas.

The lances (60) are preferably placed somewhat below, for example about six inches, the bottom face of the hearth floor (20) forming the ceiling of the respective hearth in which the lances are located so that the oxygen jets are directed into the space between the top of the rabble arms in the hearth and the ceiling of the hearth. The oxygen outlet passages (65) of the nozzle are in a plane which is preferably positioned nearly horizontally in the furnace. The heads are rotated so that the oxygen jets are directed slightly downward, for example, by about 10°, and away from the ceiling of the hearth. This is done to minimize impingement of the oxygen jets on the hearth ceiling which may damage the hearth floor (20). The high velocity flow of oxygen over the solids kicks up some dust and particles of sludge, but this is not a substantial problem and it may even be an advantage in the drying zone as the entrained sludge particles typically ignite and release heat. Also, the sludge in the drying zone generally comprises larger, heavier particles which are more difficult to entrain thus avoiding excessive dust carryover. While, as described below, the oxygen lances additionally may be used in either or both of the burning and cooling zones, if so used the high velocities in these zones, where more fine ash is present, may create a problem of dust entrainment.

In operation of the incinerator furnace, dewatered sludge is admitted through the inlet (16) into the top hearth (18-1), called an "in hearth" of the drying zone. It is broken up and moved over the hearth floor (20-1) by the rabble arms in the hearth toward the enlarged central opening (27) of the hearth floor and to drop into the lower hearth (18-2) of the drying zone, called an "out hearth". From there, it is conveyed outwardly over and on hearth floor (20-2) by the hearth rabble arms toward its peripheral drop holes (36). All during this time the sludge is subjected to heat from the burners (46), if present, to dry the sludge.

The sludge, now at least partly dried, enters into the upper "in hearth" (18-3) of the burning zone and moves inwardly toward the enlarged central opening (27) of hearth floor (20-3) and drops into the lower "out hearth" (18-4) of the burning zone. In the burning zone hearths (18-3) and (18-4), the dried sludge is subjected to additional heat from the burners (46), if used, and is converted primarily to ash.

The burned sludge converted to ash moves through the drop holes (36) of hearth floor (20-4) of the burning zone hearth (18-4) into the upper hearth (18-5) of the cooling zone. The ash is then moved toward the center of the furnace and drops through the enlarged opening of hearth floor (20-5) into the lower hearth (18-6) of the cooling zone. During its passage through the hearths (18-5) and (18-6) the ash is cooled, assisted by the cooling air supplied from conduit (21) and the cooled ash is removed from the furnace through the outlet port (17).

As seen, the sludge moves through the furnace from top to bottom in the serpentine path shown by the dotted line (S). A countercurrent flow of the waste gases produced during drying and combustion of the sludge moves in a serpentine path through the furnace from bottom to top as shown by the solid line (E).

The high momentum oxygen lances (60) in the drying zone hearth (18-2) creates a high speed swirling motion on the lowest drying zone hearth (18-2) above the burning zone "in hearth" (18-3). The high momentum oxygen provides strong convection and rapid gas phase mixing in the drying zone hearth (18-2) which burns the combustible gases from below, promotes heat transfer to the heating and drying solids, and reduces the amount of unburned hydrocarbons reaching the afterburners (not shown). The intense convection caused by the high momentum injected oxygen also initiates combustion of the solids directly, even though the solids still contain substantial amounts of water at this point. This further improves the heating and drying rate and reduces the amount of sludge that must be processed on lower hearths.

The swirling hot flow of the combustible gas enriched with the injected oxygen initiates combustion of the sludge on the sludge surface even as it continues drying below the surface, thus releasing more heat and improving the drying rate. It is possible to achieve burning of these wet solids even when there are no combustible gases entering from lower hearths. Overall, the increased heating and drying rate improves the furnace throughput, while the fuel rich burning zone controls the furnace temperature within the limits of the refractory material by virtue of the combustible gas removing chemical energy which is then utilized in the drying zone instead of oil or gas fuel. Furthermore, the turbulent mixing within the hearth with the oxygen lances ensures that odor and hydrocarbon gases are destroyed.

The increased heating rate due to the strategically positioned oxygen lancing of the invention enables an increase in the feed rate into the furnace of material to be processed. Indeed, without such increase in the feed rate, the furnace would overheat. Generally the invention enables an increased input feed rate of up to 50 percent or more over that attainable with conventional air fired multiple hearth furnaces. The increased processing rate enables a decrease in emissions. For example, hydrocarbon emissions and NOx emissions are each decreased by up to 50 percent or more on a processed product basis over that attainable with conventional air fired multiple hearth furnaces. Fuel gas consumption can also be decreased by over 50 percent on a processed product basis.

The invention also allows the use of mildly reducing conditions in the burning zone to control temperatures and reduce fuel consumption without the drawbacks of soot buildup and increased unburned hydrocarbons. To take advantage of the supplemental oxygen, the combustion air supply to the lower parts of the furnace is reduced so that the gas phase in the burning zone is under reducing conditions which limits its peak temperature. The amount of combustion air is adjusted to control the burning zone temperatures and zone length, and to balance overall furnace stoichiometry. If needed, the furnace can be provided with a supply of additional air to one or more of its zones. The air supply can be used to control the temperature in the zone.

In some cases, furnace operation can be additionally improved by injecting oxygen into the burning zone formed by hearths (18-3) and (18-4).

Operating the burning zone slightly fuel-rich can control temperatures. The furnace can transition from an oxidizing burning zone to a reducing burning zone and back while the oxygen maintains heat released in the drying zone from combustion of solids alone or of solids and combustible gases together. Maintaining the heat release in the drying zone while the burning zone stoichiometry changes helps to dampen these fluctuations and makes furnace operation much easier and more stable.

The invention has been tested on an eleven hearth Nichols incinerator which is normally fed up to 20,000 lb/hr of dewatered sludge with a solids content of approximately 22%, the balance being water. A furnace of this type has eleven hearths as compared to the six hearths shown in the furnace of FIG. 1. In the furnace tested, the fifth hearth (from the top) was lanced with oxygen. Heating and drying occurs on hearths 1 through 5 and burning occurs on hearths 6 through 8. Hearth number 5 was also selected for the oxygen lancing because it is an "out" hearth in which the process gas flows from below at the perimeter and flows toward the furnace central axis where it passes upward into the next hearth.

In this test, the oxygen was injected concurrently with the gas flow, which is preferred. At sludge throughput of up to 30,000 lb/hr and oxygen flow rates of 24,000 SCFH, the furnace appeared to operate best with the combustion air restricted until the flue gas excess oxygen level was approximately 2%–4% on a dry basis. Any lower excess oxygen level would lead to excessive unburned hydrocarbon emissions. The center shaft speed was increased from about 1.2 rpm during normal operation to approximately 2.4 rpm or higher in order to thin out the solids bed and to keep the burning zone from moving up too high in the furnace.

Fuel gas consumption decreased from 8.7 MMBTU/hr with conventional practice to 5.8 MMBTU/hr with the practice of this invention.

A combination of sludge drying and burning was initiated with oxygen on hearth 5 and this continued on hearth 6, with fully dried sludge burning on hearths 7 and 8. During this operation, hearth 5 was limited to temperatures of about 1600°–1650° F., and the drying hearths above it were maintained at the highest possible temperatures but below 1600° F. Under oxygen enrichment conditions, the afterburner may be operated at low fire while still achieving reduced emission of unburned hydrocarbons.

The oxygen lances could be placed in every hearth to gain flexibility in control when the furnace zones shift out of their normal locations. For example, the drying zone may extend beyond hearth 5 into hearth 6, or even further, and it might be desired to have oxygen lances there to heat up that hearth and re-establish it as a burning zone.

It is most preferable to place oxygen lances on more than one of the heating zone hearths. There is a limit to how much oxygen can be injected into a single hearth without causing overheating, and there are diminishing returns as the gas phase mixing is no longer the limiting factor. By dividing the same oxygen flow onto two or more hearths, improved convection is obtained over two or more times the sludge surface area, allowing higher throughputs and better oxygen economy. This configuration also allows higher total oxygen input without overheating, facilitating still higher furnace throughput.

As seen from the above, the invention includes: (a) the use of oxygen, (b) high momentum oxygen lances to promote convection and turbulent mixing in the heating zone, and (c) operation of the burning zone under slightly fuel rich conditions or low excess oxygen conditions while the heating or drying zone is operated with excess oxygen. It may be possible to practice parts (a) and (b) while operating the furnace with either excess oxygen in the burning zone or with fuel rich conditions throughout the furnace. If the furnace is operated with substantial excess oxygen in the burning zone, there will be little or no reduction in the volume of the flue gas and there will be little combustible gas to burn with the oxygen jets in the drying zone. Operating the burning zone under low excess oxygen conditions is acceptable provided that the temperatures are not too excessive, and heat release in the drying zone is maintained from the combustion of the wet solids directly. The entire furnace may be operated under fuel-rich conditions. However, this requires a large and efficient afterburner to destroy the unburned hydrocarbons. Operating with air rather than oxygen will quench the combustion process and will not reduce the volume of flue gas. Low velocity lancing will not provide adequate mixing to provide complete burnout and to increase convection to improve the drying rate. Oxygen enrichment of the furnace combustion air will not improve gas phase mixing or increase convection heat transfer to the sludge, but it will cause excessively high temperatures in the burning zone.

As mentioned, the invention may be practiced by using high momentum oxy-fuel burners for the lances, and all the benefits could be realized as well as gaining an added degree of control over the combustion in the hearth.

Mechanically, it is possible to replace the described draft-cooled lances with different lance types which are cooled by different means or which are made of different materials. It is not necessary to have six lances in the hearth, any suitable number will suffice, and the hole patterns in each lance need not be the same.

It may be desirable to place oxygen lances in the lower hearths comprising the cooling zone in order to accelerate the burnout of any embers which may remain. This may be used as a control mechanism for pushing the burning zone higher in the furnace.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A multiple hearth furnace for processing material comprising:

a housing having a plurality of hearths therein one above the other and forming a heating zone and a burning zone beneath the heating zone and means for receiving all the material to be processed in the uppermost hearth, wherein material received in said heating zone is heated therein; and at least one lance for supplying oxygen into said heating zone at a high velocity exceeding 350 feet per second to produce a motion in said heating zone so as to aid in at least one of augmentation of turbulent gas-phase mixing, increased convection over the heating material and ignition of the heating material to increase its heating rate.

2. A multiple hearth furnace as in claim 1 further comprising a burner for supplying combustible fuel to at least one of said heating zone and said burning zone.

3. A multiple hearth furnace as in claim 2 wherein said at least one burner supplies the combustible fuel and said at least one lance supplies the oxygen with the same direction of flow.

4. A multiple hearth furnace as in claim 1 wherein the heating zone is a drying zone and material received in said heating zone is at least partly dried therein.

5. A multiple hearth furnace as in claim 1 further comprising at least one oxygen lance for supplying oxygen to said burning zone.

6. A multiple hearth furnace as in claim 1 wherein said heating zone is formed by a plurality of vertically stacked hearths, said at least one oxygen lance supplying oxygen to the lowermost hearth of said heating zone closest to said burning zone.

7. A multiple hearth furnace as in claim 1 wherein said burning zone is formed by a plurality of vertically stacked hearths, further comprising at least one oxygen lance supplying oxygen to the uppermost hearth of said burning zone closest to said heating zone.

8. A multiple hearth furnace as in claim 1 wherein there are a plurality of lances spaced around the housing for supplying oxygen into said heating zone, each lance having a flow pattern in the same flow direction in said heating zone.

9. A multiple hearth furnace as in claim 1 wherein said at least one lance provides both fuel and oxygen into the heating zone and constitutes an oxy-fuel burner.

10. The furnace as in claim 1 wherein the said high velocity is sonic velocity.

11. A method of operating a multiple hearth furnace having a plurality of hearths one above the other with the hearths forming from the upper to the lower portion of the furnace a heating zone for receiving material being processed, a burning zone and a cooling zone, comprising the steps of:

supplying all material being processed to the uppermost hearth of said heating zone;

supplying oxygen into said heating zone at a high velocity exceeding 350 feet per second to produce a motion in said heating zone so as to aid in at least one of augmentation of turbulent gas-phase mixing, increased convection over the material being processed, ignition of the material being processed and increased heating rate of the material being processed;

combusting heated material being processed from said heating zone into ash in said burning zone; and cooling the ash from said burning zone in said cooling zone.

12. The method as in claim 11 wherein the material supplied to the heating zone contains water and the material is at least partly dried in the heating zone.

13. The method as in claim 11 wherein the material is sludge.

14. The method as in claim 11 wherein additional fuel is provided into at least one of the burning zone and the heating zone.

15. The method as in claim 11 wherein said heating zone is formed by a plurality of vertically stacked hearths and the oxygen is supplied into the heating zone in the lowermost hearth of said heating zone closest to said burning zone.

16. The method as in claim 11 wherein the said high velocity is sonic velocity.

* * * * *